Nov. 6, 1945.  C. E. SIMPSON  2,388,296
TRIPOD
Filed Nov. 5, 1943   2 Sheets-Sheet 2
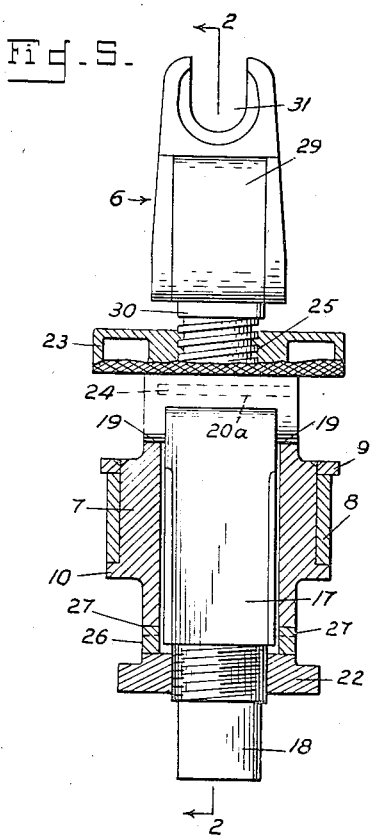
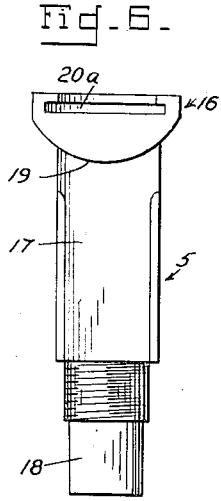
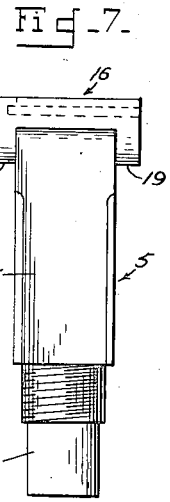
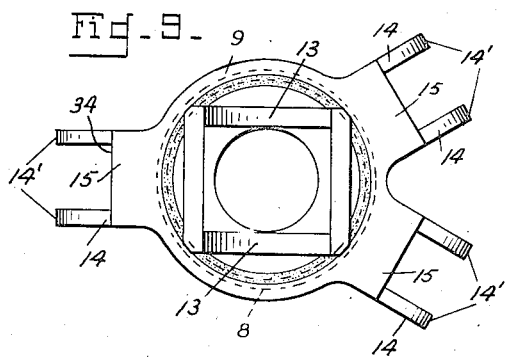
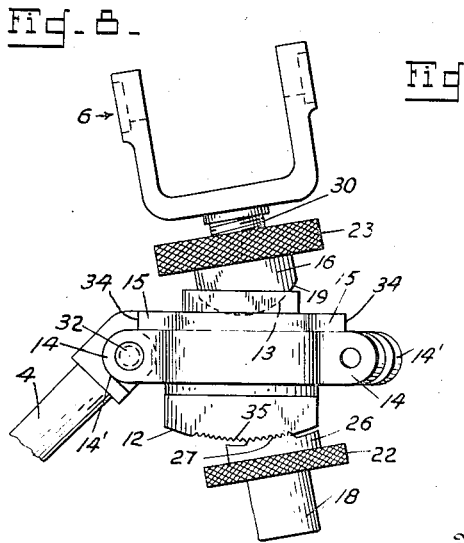
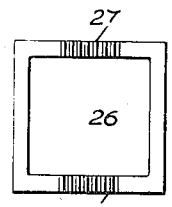
Inventor
Clarence E. Simpson Patented Nov. 6, 1945

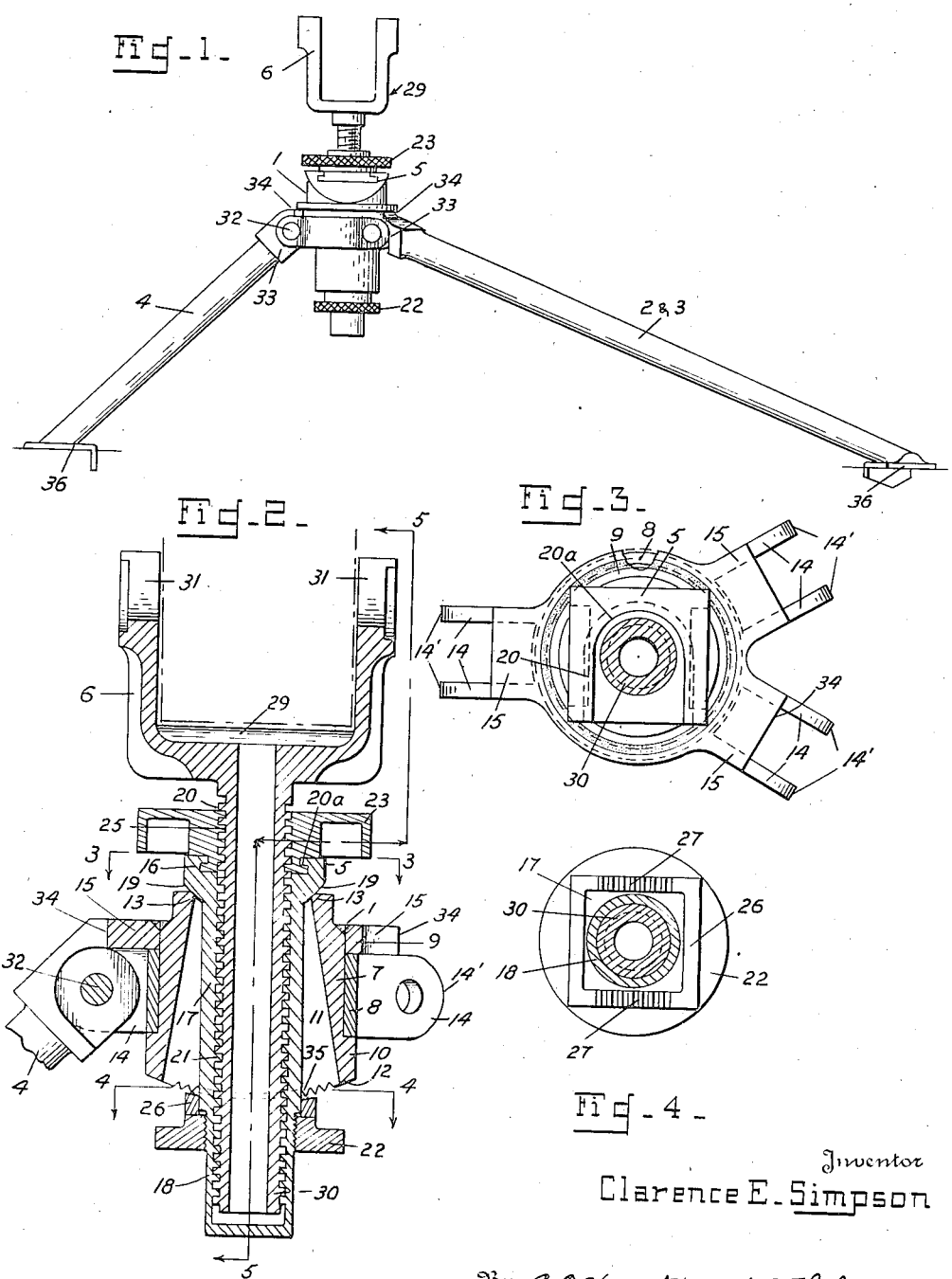

2,388,296

UNITED STATES PATENT OFFICE 2,388,296

TRIPOD

Clarence E. Simpson, Springfield, Mass.

Application November 5, 1943, Serial No. 509,079

5 Claims. (Cl. 248—183)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a support, more particularly to a tripod support for automatic firearms.

In the past the most common fault of tripod supports for objects such as automatic weapons was the inability to adjust such supports to bring the horizontal axis of the weapon into a truly level plane. This was largely due to the rough terrain on which the tripod is usually set up. If the top of the tripod is not in a horizontal plane the gun mounted on the tripod will then be canted to one side or the other making it difficult for the firer to properly align the sights of the gun.

Accordingly, it is an object of this invention to provide an improved adjustable support for an object.

A further object of this invention is to provide a tripod support having an adjustable head to eliminate canting of the objects supported.

The specific nature of the invention as well as other objects and advantages thereof will clearly appear from a description of a preferred embodiment as shown in the accompanying drawings in which:

Fig. 1 is a side elevational view of the tripod showing the legs in the extended position.

Fig. 2 is an enlarged detail longitudinal sectional view taken along the plane 2—2 of Fig. 5 of the tripod head showing the manner of mounting and securing the yoke to the head.

Fig. 3 is a cross sectional view taken along the plane 3—3 of Fig. 2.

Fig. 4 is a cross sectional view taken along the plane 4—4 of Fig. 2.

Fig. 5 is a side view partly in section of the yoke shown mounted in the tripod head.

Fig. 6 is a side elevational view of the bushing.

Fig. 7 is a front elevational view of Fig. 6.

Fig. 8 is a detail view showing the bushing and yoke in a canted position.

Fig. 9 is a top elevational detail view showing the collar and flange mounted on the tripod head and the bushing inserted in the tapered square axial hole of the tripod head.

Fig. 10 is a bottom elevational view of the locking nut.

Fig. 11 is a longitudinal sectional view of Fig. 11 showing the locking serrations.

There is shown in assembled relation in Figs. 1, 2 and 3 a tripod comprising mainly a head 1, legs 2, 3 and 4, a pivoting bushing 5 and a yoke 6 for mounting the weapon. The head 1 comprises a body portion or base member 7, a collar 8 and a flange 9. Body portion 7 is a cylindrical member which has an integral flange 10 on the lower end thereof. The interior of the body portion 7 is provided with a square, tapered axial hole 11. The large end of hole 11 is on the bottom of body portion 7. The bottom of body portion 7 is arcuately shaped to form a partial cylindrical surface 12. On such surface there are provided a series of V-shaped serrations 35 for a purpose to be described. A concave partial cylindrical surface 13 having a common axis with surface 12 is formed in the top of body portion 7 and is intersected by hole 11.

A collar 8 surrounds the body portion 7 and abuts the integral flange 10 of body portion 7. Collar 8 is provided with three integral bifurcated lugs 14. Each lug 14 has a rounded end 14'. The bifurcated lugs 14 are located about collar 8 in such a manner as to provide the best angular position of the tripod legs for proper distribution of the recoil forces of the firearm. Collar 8 is suitably pinned to the body portion 7 to secure the collar in place. A flange 9 is placed about body portion 7 and abuts the collar 8 and is secured to the body portion 7 preferably by welding. Flange 9 (Fig. 3) is provided with three integral lugs 15 having the same spacing as the integral bifurcated lugs 14 on collar 8 and each lug 15 is mounted directly above each of the corresponding bifurcated lugs 14. The lugs 15 on flange 9 are provided to act as a stop for the tripod legs 2, 3 and 4 as will be described.

Bushing 5 comprises an enlarged integral head 16, a rectangular stem portion 17 and a cylindrical end 18. The head 16 of bushing 5 is of rectangular configuration. Two partial cylindrical surfaces 19 which conform to the partial cylindrical surface 13 of body portion 7 are provided on opposite sides of bushing 5 underneath head 16. An axial threaded hole 21 is provided in the stem portion 17 of bushing 5. The threaded hole 21 communicates with a semi-circular recess 20 in the top of head 16 of bushing 5. Recess 20 extends to one edge of head 16 and a T-slot 20a is provided around the walls of recess 20. The cylindrical end 18 of bushing 5 is threaded to receive a locking nut 22.

An elevation nut 23 is provided to raise and lower the yoke 6 to be described. The elevating nut 23 is provided with an integral hub portion 24 shaped to lie in recess 20 and to engage T-slot 20a in order to secure elevating nut 23 to bushing 5.

An axial threaded hole 25 having the same threads as axial hole 21 is provided in elevating nut 23. The nut 23 is assembled in position by sliding it into the recess 20 from the open end thereof.

The bushing 5 is inserted in the square hole 11 in body portion 7 and a locking washer 26 is placed about the square body portion 17 of bushing 5. V-shaped serrations 27 corresponding to V-shaped serrations 35 are provided on the top arcuate surface of locking washer 26. The arcuate surface of washer 26 conforms to the arcuate surface 12 of body portion 7. The washer 26 is placed adjacent body portion 7 so that the V-shaped serrations 27 engage serrations 35 on body 7. Locking nut 22 is then screwed onto the threaded portion of end 18 of bushing 5 to lock the bushing in position as will be more fully described.

The yoke 6 which comprises a U-shaped bracket 29 and a threaded stem 30 is then threaded into axial hole 21 in bushing 5. The threaded stem 30 is preferably integrally formed on the bottom of bracket 29 and is located in the center thereof. In each of the upstanding arms of U-shaped bracket 29 a horizontal hole 31 is provided to receive a trunnion pin (not shown) on which the firearm is mounted.

The legs 2, 3 and 4 are placed between the bifurcated lugs 14 on collar 8 and are secured thereto by bolts 32. The legs 2, 3 and 4 are tubular members, one end of each having a solid end 33 suitably shaped to fit between the lugs 14 of collar 8 and to engage each of the rounded ends 14' of lugs 14. A shoulder 34 is provided on each of the solid ends 33 which abuts against lugs 15 on flange 9 when the legs 2, 3 and 4 are in the extended position as shown in Fig. 1. In this position the head 1 of the tripod is raised a convenient distance above the ground so that the weapon may be comfortably fired by the firer. Suitable spade feet 36 are welded to each of the legs 2, 3 and 4 to assist in anchoring the tripod to the ground. The legs 2 and 3 are preferably longer than the leg 4 and extend to the rear when the tripod is set up for firing. The angular displacement between legs 2 and 3 is comparatively small to afford more rigid support against the thrust of the recoil. Leg 4 extends forwardly for the front support of the tripod.

When the tripod is set up in operating position as shown in Fig. 1, the yoke 6 may be conveniently elevated or depressed by turning the elevating nut 23. The head 1 of the tripod may be quickly and conveniently brought into a horizontal plane by unloosening locking nut 22 which brings lock washer 26 out of engagement with serrations 35 and the bushing 5 may then be pivoted within the tapered square hole 11 until the yoke 6 is in a horizontal plane. When the yoke is positioned where desired bushing 5 is then readily locked in place by tightening lock nut 22 which brings lock washer 26 firmly against serrations 35 thereby securing yoke 6 against displacement.

It is thus apparent that great rigidity and yet ease of adjustment may be had from a tripod embodying this invention. Rapid adjustment and elevation is quickly obtained by merely turning the elevating nut 23 and quick and positive adjustment to correct canting of the weapon is readily obtainable by loosening the locking washer and adjusting the pivotable bushing to bring the gun into a horizontal plane. The legs of the tripod may be conveniently folded into a compact unit thereby facilitating carrying of the tripod.

Obviously the improved tripod is equally applicable for adjustably supporting objects other than firearms.

I claim:

1. A support for an object such as an automatic firearm comprising in combination, a cylindrical base member having a plurality of legs pivotally secured thereto, said base member being provided with a concave partial cylindrical upper surface with a vertical axial opening extending therethrough and through the base member, a bushing mounted within said opening and provided with a part having a convex partial cylindrical surface arranged to engage said concave partial cylindrical surface whereby said bushing is pivotally supported in said base member for movement about the axis of said concave partial cylindrical surface, means for locking said bushing in a plurality of pivotal positions with respect to said base member, and a support member for said object mounted within said bushing and adapted to be elevated or depressed vertically with respect to said bushing.

2. A support for an object such as an automatic firearm comprising in combination, a cylindrical base member having a plurality of legs pivotally secured thereto, said base member being provided with a concave partial cylindrical upper surface with a vertical axial opening extending therethrough and through the base member, a bushing mounted within said opening having an upper part provided with a relatively convex partial cylindrical surface arranged to engage said concave partial cylindrical surface whereby said bushing is pivotally supported in said base member for movement about the axis of said concave partial cylindrical surface and having a lower part projecting below said base member, a support member for said object mounted within said bushing and adapted to be elevated or depressed vertically with respect to said bushing, a nut threadedly secured to said lower part of said bushing, and a locking washer between said nut and the lower surface of said base member.

3. A support for an object such as an automatic firearm comprising in combination, a cylindrical base member having a plurality of legs pivotally secured thereto and provided with a first arcuate surface on its upper side and a second arcuate surface on its lower side, said arcuate surfaces having a common axis and said base member being provided with a continuous opening which extends vertically between and connects said surfaces, said second arcuate surface being provided with a plurality of serrations, a bushing extending into said opening and having a portion projecting below said second arcuate surface, said bushing being provided with an arcuate surface for engaging said first arcuate surface whereby the bushing is pivotally supported on the base member, a support member for engaging said object mounted within said bushing, means for vertically elevating or depressing said support member with respect to said bushing, and a locking member mounted on said projecting portion of the bushing below said second arcuate surface and provided with an upper arcuate surface which normally engages the said serrations on said second arcuate surface.

4. A support as set forth in claim 1 wherein said bushing is formed to have a substantially rectangular upper head portion and a cylindrical lower end portion and said locking means includes a nut threadedly secured to said lower end portion of the bushing.

5. A support for an object such as an automatic firearm comprising in combination, a cylindrical base member having a plurality of legs pivotally secured thereto and provided with a first arcuate surface on its upper side and a second arcuate surface on its lower side, said arcuate surfaces having a common axis and said base member being provided with a continuous and substantially rectangular upwardly-tapering axial opening which extends vertically between and connects said surfaces, a bushing extending into said opening and having a substantially rectangular upper head portion normally disposed above said first surface and a cylindircal lower portion which projects below said second arcuate surface of the bushing, said head portion being provided with an arcuate surface which normally engages said first arcuate surface whereby the bushing is pivotally supported in said base member for movement relative to the axis of said opening, said second arcuate surface being provided with a plurality of serrations, a locking member mounted on said cylindrical portion of the bushing and provided with an upper arcuate serrated surface which normally engages the serrations on said second arcuate surface, a support member for engaging said object mounted within said bushing, and a nut engaged with said head portion and adapted to elevate or depress said support member with respect to said bushing.

CLARENCE E. SIMPSON.